United States Patent
Kluge et al.

(10) Patent No.: US 12,049,928 B2
(45) Date of Patent: Jul. 30, 2024

(54) ACTUATOR ASSEMBLY FOR A POSITIVELY LOCKING, SWITCHABLE CLUTCH OR A BRAKE, AND A POSITIVELY LOCKING, SWITCHABLE CLUTCH OR BRAKE FOR A MOTOR VEHICLE DRIVE TRAIN

(71) Applicant: Bayerische Motoren Werke Aktiengesellschaft, Munich (DE)

(72) Inventors: Benjamin Kluge, Munich (DE); Sebastian Liebert, Unterfoehring (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 368 days.

(21) Appl. No.: 17/423,546

(22) PCT Filed: Jan. 21, 2020

(86) PCT No.: PCT/EP2020/051321
§ 371 (c)(1),
(2) Date: Jul. 16, 2021

(87) PCT Pub. No.: WO2020/164866
PCT Pub. Date: Aug. 20, 2020

(65) Prior Publication Data
US 2022/0112924 A1 Apr. 14, 2022

(30) Foreign Application Priority Data
Feb. 15, 2019 (DE) .................. 10 2019 103 831.6

(51) Int. Cl.
*F16D 27/108* (2006.01)
*F16D 27/00* (2006.01)
(Continued)

(52) U.S. Cl.
CPC ......... *F16D 27/108* (2013.01); *F16D 27/004* (2013.01); *F16D 63/002* (2013.01);
(Continued)

(58) Field of Classification Search
CPC .... F16D 27/108; F16D 27/004; F16D 27/112; F16D 27/118; F16D 63/002; F16D 11/00;
(Continued)

(56) References Cited

U.S. PATENT DOCUMENTS 3,977,304 A * 8/1976 Meissner .............. B60T 17/086
92/33
2007/0250237 A1 10/2007 Zak
(Continued)

FOREIGN PATENT DOCUMENTS

CN 103115050 A 5/2013
CN 106716565 A 5/2017
(Continued)

OTHER PUBLICATIONS

Chinese-language Office Action issued in Chinese Application No. 202080007544.4 dated Jun. 30, 2022 with English translation (17 pages).
(Continued)

*Primary Examiner* — Vishal R Sahni
(74) *Attorney, Agent, or Firm* — Crowell & Moring LLP (57) ABSTRACT

An actuator assembly for a positively locking, switchable clutch or a brake includes a shaft that can be rotated with respect to a rotational axis and an actuator slide for actuating the freewheel. The actuator slide is rotationally connected to the shaft and can be moved relative to the shaft in the axial direction between a first position and a second position and an actuator, which is stationary at least in part, that moves the actuator slide between the first position and the second position. The actuator includes a stationary coil, which, in the energized state, generates a magnetic field, in which the actuator slide can be moved out of the first position into the second position or vice versa. The coil is not energized in the
(Continued)

first and in the second position. The actuator fixes the actuator slide in the first position and the second position.

11 Claims, 5 Drawing Sheets

(51) Int. Cl.
*F16D 63/00* (2006.01)
*F16D 27/118* (2006.01)
*F16D 66/00* (2006.01)
*F16D 121/20* (2012.01)
*F16D 127/06* (2012.01)
*F16D 129/04* (2012.01)

(52) U.S. Cl.
CPC ...... *F16D 27/118* (2013.01); *F16D 2066/003* (2013.01); *F16D 2121/20* (2013.01); *F16D 2127/06* (2013.01); *F16D 2129/04* (2013.01); *F16D 2200/0008* (2013.01); *F16D 2300/18* (2013.01); *F16D 2500/10412* (2013.01)

(58) Field of Classification Search
CPC ...... F16D 11/14; F16D 43/16; F16D 2121/20; F16D 2200/0008; F16D 2300/18; F16D 2129/04; F16D 2127/06
See application file for complete search history.

(56) References Cited

U.S. PATENT DOCUMENTS

| | | | |
|---|---|---|---|
| 2009/0127059 A1 | 5/2009 | Knoblauch | |
| 2013/0299297 A1 | 11/2013 | Van Der Seylberg et al. | |
| 2016/0053828 A1 | 2/2016 | Ookuma et al. | |
| 2017/0002875 A1 | 1/2017 | Beesley et al. | |
| 2017/0178779 A1 | 6/2017 | Maisch et al. | |
| 2017/0198766 A1* | 7/2017 | Onitake | ................ F16D 48/064 |

FOREIGN PATENT DOCUMENTS

| | | | |
|---|---|---|---|
| CN | 106969065 A | 7/2017 | |
| DE | 10 2004 013 450 A1 | 9/2005 | |
| DE | 20 2010 012 903 U1 | 4/2012 | |
| DE | 11 2014 001 739 T5 | 12/2015 | |
| DE | 20 2016 107 420 U1 | 3/2017 | |
| DE | 10 2016 210 582 A1 | 12/2017 | |
| DE | 102016210582 A1 * | 12/2017 | |
| DE | 102017204113 A1 * | 9/2018 | |
| EP | 2 840 277 A1 | 2/2015 | |
| WO | WO 2007/085348 A1 | 8/2007 | |
| WO | WO 2017/215701 A1 | 12/2017 | |
| WO | WO-2017215701 A1 * | 12/2017 | |

OTHER PUBLICATIONS

International Search Report (PCT/ISA/210) issued in PCT Application No. PCT/EP2020/051321 dated Jul. 29, 2020 with English translation (five (5) pages).

German-language Written Opinion (PCT/ISA/237) issued in PCT Application No. PCT/EP2020/051321 dated Jul. 29, 2020 (five (5) pages).

German-language Search Report issued in German Application No. 10 2019 103 831.6 dated Dec. 18, 2019 with partial English translation (17 pages).

* cited by examiner

ACTUATOR ASSEMBLY FOR A POSITIVELY LOCKING, SWITCHABLE CLUTCH OR A BRAKE, AND A POSITIVELY LOCKING, SWITCHABLE CLUTCH OR BRAKE FOR A MOTOR VEHICLE DRIVE TRAIN

BACKGROUND AND SUMMARY OF THE INVENTION

The present subject matter relates to an actuator assembly for a positively locking, switchable clutch or a brake, with a shaft which can be rotated with respect to a rotational axis, an actuator slide for the actuation of the clutch or the brake, and an actuator for the movement of the actuator slide. Moreover, the present subject matter relates to a switchable, positively locking clutch or a brake for a motor vehicle drive train.

It can be necessary in a motor vehicle drive train to couple a shaft such that it can be rotated with respect to a further rotating shaft in a switchable manner by way of a positively locking clutch or to fix the shaft with respect to the housing in a switchable manner by way of a positively locking brake. The switching capability of the clutch and the brake is typically realized by way of actuators.

In an actuator assembly, the actuator slide is arranged radially with respect to the coil and is moved axially. The radial arrangement leads to high, radially acting secondary forces even in the case of a small radial offset between the actuator slide and the actuator.

It is therefore the object of the present subject matter to provide an actuator assembly that makes a reliable movement of the actuator slide possible and displaces and fixes the actuator slide in a manner that saves resources.

According to the present subject matter, in order to achieve the object, an actuator assembly for a positively locking, switchable clutch or a brake is provided, with a shaft which can be rotated with regard to a rotational axis, an actuator slide for the actuation of the positively locking, switchable clutch or the brake, the actuator slide being connected to the shaft for conjoint rotation, and it being possible for the actuator slide to be moved relative to the shaft in the axial direction between a first position and a second position, and an actuator which is at least partially stationary and moves the actuator slide between the first position and the second position, the actuator comprising a coil which is stationary and, in the energized state, generates a magnetic field, by way of which the actuator slide can be moved out of the first position into the second position or vice versa from the second position into the first position, and the coil not being energized in the first and the second position, and the actuator fixing the actuator slide in the first position and the second position.

The present subject matter is based on the basic concept that the coil is provided only for the movement of the actuator slide out of the first position into the second position and vice versa. In the first and in the second position, the actuator slide is fixed by way of the actuator in such a way that no magnetic field of the coil is necessary, to fix the actuator slide. Therefore, the first position and the second position are stable positions, as a result of which a reliable method of operation of the actuator assembly is ensured. Furthermore, a magnetic field is necessary only for the movement of the actuator slide, such that a current flows through the coil. Accordingly, the actuator assembly conserves resources, since it requires energy only for the movement of the actuator slide and not for the fixing of the actuator slide in the first position or in the second position.

An actuating apparatus can be provided on the actuator slide to actuate components of a switchable freewheel or the slider sleeve of a claw clutch. This achieves a simple and inexpensive use of the actuator assembly in a positively locking, switchable clutch or a brake.

In one refinement of the present subject matter, the actuating apparatus is provided to couple two rotatable shafts to one another.

The actuating apparatus can comprise, for example, one or more tappets which load locking pawls of a freewheel clutch.

It is also conceivable that the actuating apparatus is connected to a slider sleeve of a claw clutch, or that the actuator slide directly comprises the claws of the claw clutch.

The actuator slide can be mounted via a linear guide on the shaft to make a precise movement of the actuator slide in the axial direction possible and to prevent tilting of the actuator slide.

The movement of the actuator slide in the linear guide can be limited by way of one or more shaft-side stops which determine the first position and/or the second position.

To determine the first and the second position by way of simple and, as a result, inexpensive components, the shaft-side stops can be realized by way of pins and/or journals and/or can be other components of the actuator assembly.

In one refinement of the present subject matter, the actuator comprises a spring which extends in the axial direction and fixes the actuator slide in a position. By way of an adaptation of the spring constants of the spring, the actuator assembly can be adapted simply to requirements of a clutch or a brake, for example to the force, by way of which the locking pawls or the slider sleeve are/is to be moved.

By way of the spring, the actuator slide can be fixed in the first or in the second position, such that the actuator slide is prestressed in the corresponding direction.

In addition, a plurality of springs can be provided which are distributed symmetrically around the shaft and fix the actuator slide in one position. The multiplicity of springs makes a symmetrical distribution of force to the actuator slide possible.

It is conceivable that the spring presses the actuator slide against a stop of the linear guide.

The spring can adjoin a supporting section at its first end and can adjoin the actuator slide at its second end, the supporting section being secured at least against axial displacement on the shaft. In this way, the spring can be fastened directly to the actuator slide, as a result of which reliable fixing of the actuator slide is ensured.

The supporting section can extend in an annular manner around the actuator slide, for example as a flange.

In one refinement of the present subject matter, the supporting section has a substantially L-shaped, circumferential cross-sectional geometry in longitudinal section through the actuator assembly. The L-shaped form makes a satisfactory attachment to the shaft possible, and in addition provides a large region, in which the spring can be arranged.

It can be provided that a ball catch is provided on the shaft, which ball catch fixes the actuator slide in an intermediate position between the first and the second position.

It is also generally conceivable for a plurality of ball catches to be arranged on the shaft, with the result that the number of intermediate positions can be adapted simply to the intermediate positions which are necessary for the freewheel.

As an alternative, the intermediate position can also be realized by way of at least two springs which press the actuator slide in different directions.

In one refinement of the present subject matter, the first or the second position is realized by way of ball catches.

In one refinement of the present subject matter, the actuator has a coil which is arranged in a stationary manner and in a circumferential manner rotationally symmetrically around the shaft. Only a minimum of coil material is required as a result of the use of a single coil.

Coils can also be arranged on different sides of the actuator slide, with the result that at least one coil controls the movement from the first position into the second position, and at least one further coil controls the movement from the second position into the first position.

For example, the actuator comprises a permanent magnet which fixes the actuator slide in the first or second position. Permanent magnets form an inexpensive and reliable possibility for fixing a position of the actuator slide.

The permanent magnet can be configured on the coil and/or in a stationary manner.

As an alternative, it is also conceivable that the permanent magnet is fastened to the actuator slide.

In one refinement of the present subject matter, a plurality of permanent magnets are also provided which fix the actuator slide in the first and/or second position.

The actuator slide can lie opposite the coil and can be separated from the latter by way of an air gap, the air gap being modified in the case of the change between the first and the second position of the actuator slide, and the actuator slide moving toward the coil and away from the coil.

In other words, the actuator slide and the coil lie axially opposite one another.

This arrangement of the coil and the actuator slide makes a compact overall design of the actuator assembly possible.

In one refinement of the present subject matter, it is provided that the actuator slide is at a minimum spacing from the coil or the coils of from 0.1 to 2 mm.

To ensure a targeted effect of the magnetic field of the permanent magnet, the actuator slide can be made circumferentially from a ferromagnetic material in a radially outer region.

In one refinement of the present subject matter, the actuator slide is not magnetic or cannot be magnetized in a radially inner region, with the result that the magnetic force of the coil can act only on the radially outer region of the actuator slide. It is also conceivable that the radially inner region is made in sections or completely from a ferromagnetic material. The radially inner region preferably has a lower magnetic permeability than the ferromagnetic, radially outer region of the actuator slide.

To influence the magnetic field of the coil and/or to adapt the magnetic field of the coil to the requirements of the actuator assembly, a ferromagnetic material, for example a ferritic steel, can also be attached at least in sections around the coil and/or in a stationary manner in the region of the first or the second position of the actuator slide.

In addition, the actuator slide can also influence the magnetic field of the coil by way of the placing of ferromagnetic material on the actuator slide.

For example, the outer section of the actuator slide which is ferromagnetic at least in sections has a chamfer.

The chamfer can be arranged on that side of the actuator slide which faces the coil.

To determine the position of the actuator slide, a sensor can be provided which determines the position of the actuator slide.

The sensor can be based on the magnetic operating principle, as a result of which the sensor can be arranged in a stationary manner.

For example, the sensor measures the position of the actuator slide via the inductance in the coil.

It is also conceivable that the sensor is a Hall sensor, such as a 1D or 3D Hall sensor.

According to the present subject matter, to achieve the abovementioned object, a positively locking clutch or a brake for a motor vehicle drive train is also provided, with the abovementioned actuator assembly, it being possible for the actuator slide to switch the clutch or the brake between a freewheel position and a blocked position.

It can be provided that the actuator slide couples the shaft by means of the thrust wedge mechanism principle or by means of a claw clutch with a further shaft or locks the rotation of the shaft.

Further features and advantages of the present subject matter result from the following description, and from the appended drawings.

DETAILED DESCRIPTION OF THE DRAWINGS

Figure 1:
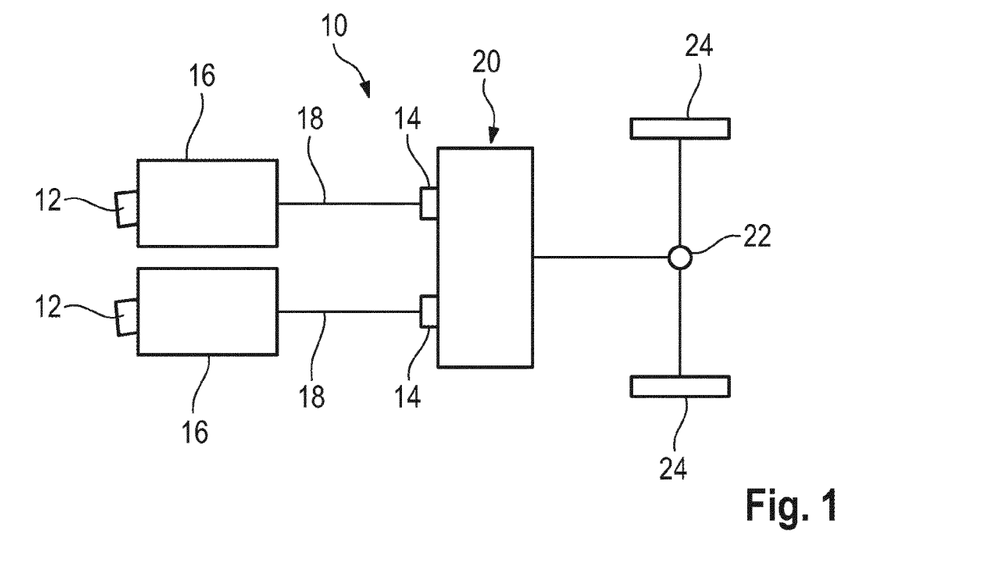
FIG. 1 shows a diagrammatic illustration of a positively locking, switchable clutch and a brake according to the present subject matter in a motor vehicle drive train.

FIG. 1 diagrammatically shows a motor vehicle drive train 10, in which two switchable brakes 12 and two positively locking, switchable clutches 14 are provided.

The brakes 12 are mounted on drive motors 16, and can couple and decouple shafts 18 to/from the drive motors 16. One drive motor 16 is, for example, an internal combustion engine, and the other drive motor 16 is, for example, an electric motor.

The positively locking clutches 14 are part of a transmission 20, for example of a summing transmission, and can connect the shafts 18 in a torque-transmitting manner to a torque output 22 which, in the example which is shown, is coupled to two wheels 22 of a motor vehicle which has the motor vehicle drive train 10.

It is generally also conceivable that the switchable brakes 12 and/or the switchable clutches 14 are used in a dedicated hybrid transmission (DHT) or in an electric hybrid transmission, in order to combine the drive trains of the electric motor and the internal combustion engine in a synergetic manner.

Figure 2:
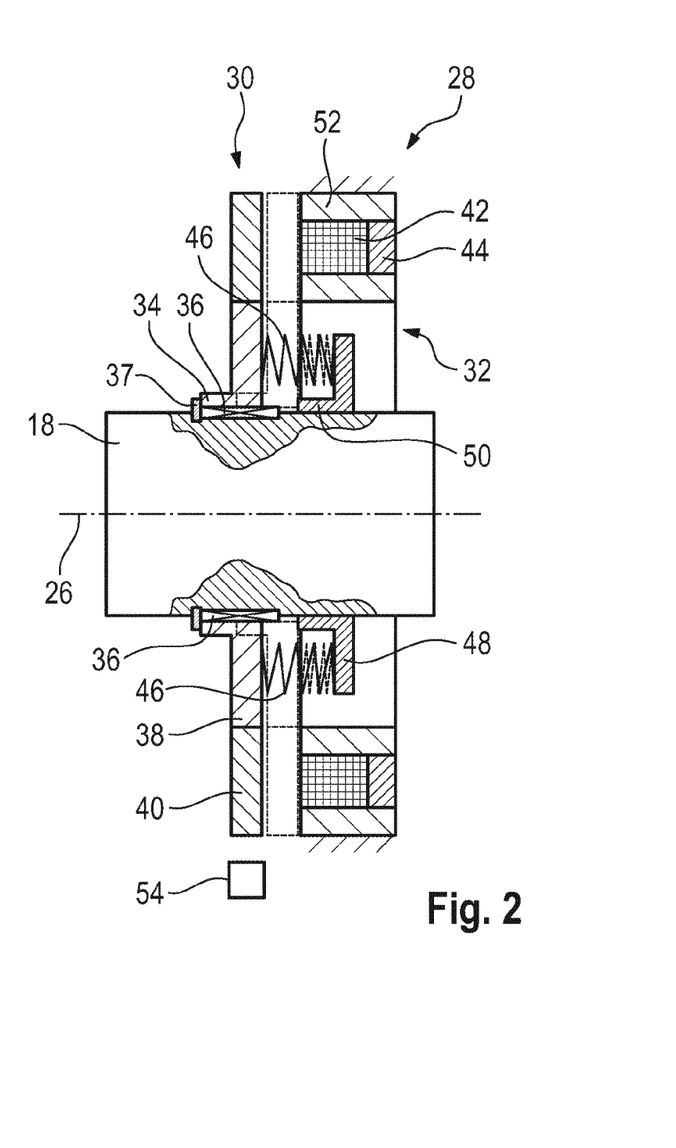
FIG. 2 shows a longitudinal section through an example of an actuator assembly according to the present subject matter of a positively locking, switchable clutch or a brake according to the present subject matter.

FIG. 2 shows a longitudinal section along the rotational axis 26 of the shaft 18 through an actuator assembly 28, as is used, for example, in the positively locking, switchable clutches or in the brakes 12, 14.

The actuator assembly 28 comprises the shaft 18 which is mounted rotatably about the rotational axis 26, an actuator slide 30 and an actuator 32.

The actuator slide 30 is an annular slide which is arranged circumferentially around the shaft 18 and is connected fixedly to the shaft 18 so as to rotate with it. The actuator slide 30 accordingly has a receiving opening for the shaft 18.

The actuator slide 30 has a radially inner region 38 and a radially outer region 40. In the example which is shown, the radially inner region 38 is made from a non-ferromagnetic material, and the radially outer region 40 is made circumferentially from a ferromagnetic material. The two sections are connected to one another in a non-releasable manner.

The radially inner region 38 can also generally be made from a ferromagnetic material, for example from a material which has a lower magnetic permeability than the material of the radially outer region 40. Moreover, the radially outer region 40 can also be ferromagnetic only in a ring.

An axial, sleeve-shaped projection 34 is provided on the radially inner region 38 of the actuator slide 30, which projection 34 increases the bearing area and driving geometry of the actuator slide 30 on the shaft. Moreover, the actuator slide 30 is mounted on the radially inner side via a linear guide 36 on the shaft 18 such that it can be displaced in the axial direction between two positions relative to the shaft 18, for example via a multiple tooth profile.

In FIG. 2, the first position of the actuator slide 30 is indicated by way of a dashed actuator slide 30, and the second position of the actuator slide 30 is shown by way of solid lines.

In the example which is shown in FIG. 2, the second position is determined by way of a stop 37 which is arranged at the end of the linear guide 36. In the second position, the axial projection 34 of the actuator slide 30 therefore abuts the stop 37, with the result that the actuator slide 30 cannot be moved further in the linear guide 36.

In the example which is shown, the actuator 32 of the actuator assembly 28 comprises a coil 42, a permanent magnet 44 and one or more springs 46. The coil 42 and the permanent magnet 44 are of rotationally symmetrical configuration about the rotational axis 26.

For reasons of clarity, components or sections which occur multiple times, such as the springs 46, are provided with a designation only once. Differences are described where appropriate.

The springs 46 extend and act in the axial direction, and are connected to the actuator slide 30 in the region of the radially inner region 38 at one end on that side of the actuator slide 30 which faces the actuator 32. At the other end thereof, the springs 46 adjoin a supporting section 48. In the example which is shown in FIG. 2, the springs 46 determine the second position of the actuator slide 30 since they press the actuator slide 30 in the linear guides 36 against the stop 37.

In the example which is shown, a plurality of springs 46 are provided circumferentially around the shaft 18, the springs 46 being distributed uniformly. It is generally also conceivable for the springs 46 to be replaced with a cup spring or a plurality of cup springs which acts or act in the axial direction.

In the example which is shown, the supporting section 48 is of annular configuration and extends substantially from the surface of the shaft 18 radially to the outside. The supporting section 48 is connected to the shaft 18, for example is fastened to the shaft 18 in a non-releasable manner.

It is generally sufficient for the supporting section 48 to be secured against axial displacement on the shaft, for example by way of the stops 37.

In a similar manner to the actuator slide 30, the supporting section 48 has an axial projection 50 which increases the bearing area of the supporting section 48 on the shaft 18. Accordingly, the supporting section 48 has a substantially L-shaped, circumferential cross section in the longitudinal section of FIG. 2.

It is also conceivable that the supporting section 48 is disk-shaped, with the result that the supporting section 48 has a substantially I-shaped, circumferential cross section in the longitudinal section of FIG. 2.

In the example which is shown, the coil 42 is configured as a toroid coil, and encloses the shaft 18 partially. The coil 42 is configured concentrically with respect to the rotational axis 26, and is arranged adjacently with respect to the radially outer region 40 of the actuator slide 30.

If a current flows through the windings of the coil 42, a magnetic field is generated which acts on the ferromagnetic, radially outer region 40 of the actuator slide 30 and exerts a force on the actuator slide 30.

The magnetic axis of the coil 42 runs concentrically in parallel or concentrically with respect to the rotational axis 26 of the shaft 18. The magnetic axis is to be understood as the shortest connection of the north pole and the south pole of the coil 42.

The coil 42 of the actuator 32 has a coil former 52 which encloses the coil 42 and is mounted in a stationary manner, for example on a housing of the positively locking, switchable clutch or the brake 12, 14. Accordingly, the coil 42 is also arranged in a stationary manner.

The coil former 52 is made from a ferromagnetic material and, in the example which is shown in FIG. 2, also encloses the permanent magnet 44 which is arranged on that side of the coil 42 which faces away from the actuator slide 30.

The permanent magnet 44 is a commercially available ring magnet which is magnetized radially. Any magnetization which holds the actuator slide 30 in the first position and/or in the second position is generally conceivable.

To detect the position of the actuator slide 30, a sensor 54 is provided in addition. The sensor 54 is, for example, a Hall sensor, and detects the modification of a magnetic field, brought about by way of the movement of the actuator slide 30.

Any sensor which can detect the position of the actuator slide 30 is generally conceivable, for example also a sensor 54 with a light barrier or a distance measurement means.

It will be described in the following text by way of example how the actuator slide 30 is moved out of the second position into the first position by way of the actuator 32.

In the position which is shown in FIG. 2, the actuator slide 30 is fixed in the second position by way of the springs 46. To move the actuator slide, a current flow through the windings of the coil 42 is initiated, with the result that the magnetic field of the coil 42 has the same orientation as the magnetic field of the permanent magnet 44.

The radially outer region 40 of the actuator slide 30 is ferromagnetic, with the result that the actuator slide 30 is attracted by way of the reluctance force (also known as a Maxwell force) of the combined magnetic field of the coil 42 and the permanent magnet 44.

If the magnetic action of force of the coil 42 and the permanent magnet 44 on the actuator slide 30 is greater than the restoring force of the springs 46, that is to say greater than the force, by way of which the springs 46 press the actuator slide 30 into the second position, the actuator slide 30 moves in the direction of the coil 42 or in the direction of the coil former 52.

Therefore, the spacing between the radially outer region 40 of the actuator slide and the permanent magnet 44 decreases, as a result of which the force which acts on the actuator slide 30 by way of the permanent magnet 44 rises.

In the case of correct dimensioning of the attraction force of the permanent magnet 44 and the repelling restoring force of the springs 46, the actuator slide 30 is fixed in the first position by way of the magnetic field of the permanent magnet 44.

It is to be emphasized that, in FIG. 2, the first position of the actuator slide 30 is determined by way of the axial projection 50 of the supporting section 48 and not by way of the coil former 52. In the first position, the actuator slide 30 accordingly abuts the axial projection 50 of the supporting section 48.

The radially outer region 40 of the actuator slide 30 is therefore arranged, in the first position, in a spacing which is filled with air from the coil 42 and the coil former 52. Accordingly, an air gap is provided between the coil 42 and the radially outer region 40 of the actuator slide 30.

The air gap has a minimum size of from 0.1 to 2 mm.

The air gap between the coil 42 and the radially outer region 40 of the actuator slide changes between the first and the second position; the air gap in the second position is greater than in the first position.

The shaft 18 (and also the actuator slide 30) can therefore rotate further although the actuator slide 30 is fixed in the first position.

In the example which is shown in FIG. 2, the permanent magnet 44 fixes the actuator slide in the first position, and the springs 46 fix the actuator slide 30 in the second position. As a consequence, the actuator slide 30 is fixed in the first position and in the second position, without a current flowing through windings of the coil 42.

The coil 42 is therefore not energized in the first position and in the second position of the actuator slide 30, and does not generate a magnetic field.

The magnetic field which is generated by way of the coil 42 is accordingly required only in order to move the actuator slide 30 out of the first position into the second position and vice versa.

In order to move the actuator slide 30 out of the first position into the second position, a current flow through the windings of the coil 42 is initiated, with the result that the magnetic field of the coil 42 counteracts the magnetic field of the permanent magnet 44.

For example, the current can be selected in such a way that the magnetic fields of the coil 42 and the permanent magnet 44 balance one another in the first position of the actuator slide 30.

In this case, the reluctance force which acts on the actuator slide 30, resulting from the arrangement of the actuator slide 30 in the combined magnetic field of the coil 42 and the permanent magnet 44, is smaller than the restoring force of the springs 46, with the result that the actuator slide 30 is moved out of the first position in the direction of the second position.

In the example which is shown, the arrangement of the permanent magnet 44 is to be understood merely by way of example.

The permanent magnet 44 is generally integrated into the iron circuit of the actuator assembly 28, that is to say into the assembly which is formed by way of the coil 42, the coil former 52 and the actuator slide 30. If the permanent magnet 44 is attached to the actuator slide 30, then it is preferably attached on the ferromagnetic region of the actuator slide 30, for example, in the radially outer region 40.

Figure 3:
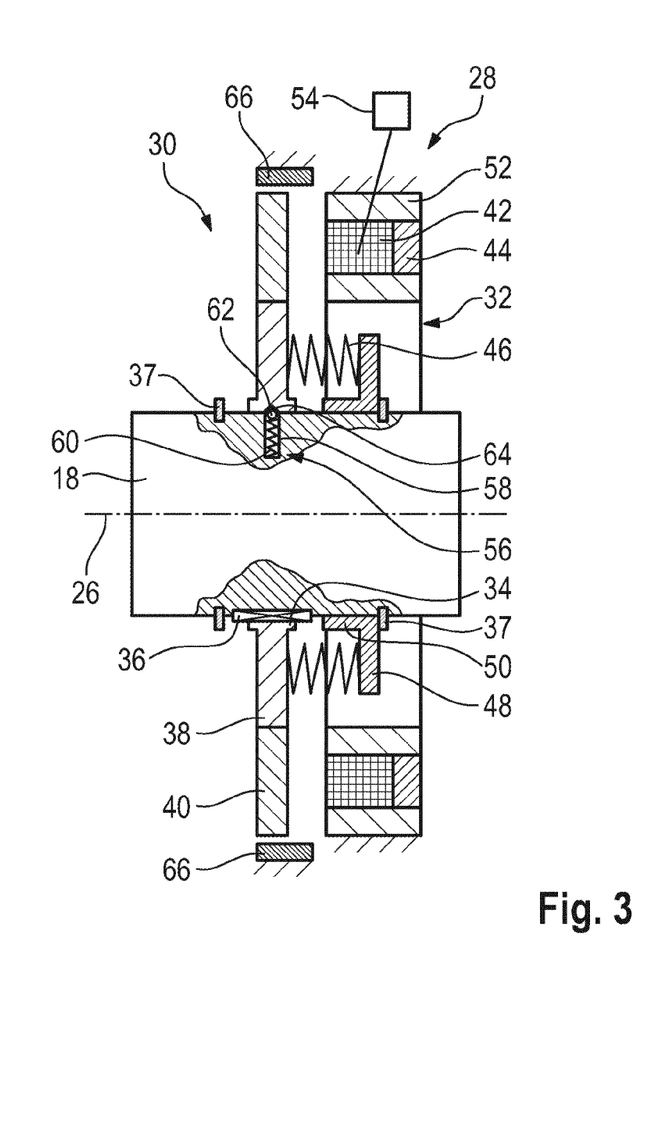
FIG. 3 shows a longitudinal section through an example of an actuator assembly according to the present subject matter of a positively locking, switchable clutch or a brake according to the present subject matter with a magnetic field influencing means which is fixed to the housing.

In an analogous manner to FIG. 2, FIG. 3 shows the actuator assembly 28 in a longitudinal section along the rotational axis 26.

In contrast to the example which is shown in FIG. 2, the actuator slide 30 of FIG. 3 can also be fixed in an intermediate position between the first and the second position. This intermediate position is shown in FIG. 3.

The actuator slide 30 is realized in the intermediate position by way of a ball catch 56. The ball catch 56 comprises a radial blind bore 58 in the surface of the shaft 18, a spring 60, a ball 62 and a wedge-shaped depression 64 in that side of the actuator slide 30 which adjoins the shaft 18.

The spring 60 is arranged in a prestressed state in the blind bore 58, and presses the ball 62 out of the blind bore 58 in the direction of the actuator slide 30, with the result that the ball 62 engages into the wedge-shaped depression 64 in the intermediate position.

In the intermediate position, the ball catch 56 balances the differential force of the restoring force of the springs 46 and the force of the permanent magnet 44, with the result that the actuator slide 30 is fixed in the intermediate position by way of the ball catch 56.

The actuator slide 30 can also be moved by way of the magnetic field of the coil 42 between the first position, the intermediate position and the second position in this example.

One or a plurality of stationary, ferromagnetic components 66 is/are provided which serve to influence the magnetic flux. By way of the ferromagnetic components 66, the force path which acts on the radially outer region 40 of the actuator slide 30 can be influenced over the movement range of the actuator slide 30.

In the example which is shown in FIG. 3, the annular components 66 can be configured, for example, with a rectangular cross-sectional profile. Any profile shape of the component 66 is generally conceivable, however. The shape is adapted to the desired magnetic field of the coil 42.

In FIG. 3, the sensor 54 is connected to the coil 42 and determines the position of the actuator slide 30, for example in a manner which is based on the inductance of the coil 42.

Furthermore, the supporting section 48 is supported by way of a further stop 37 on the side which faces away from the actuator slide 30.

Figure 4:
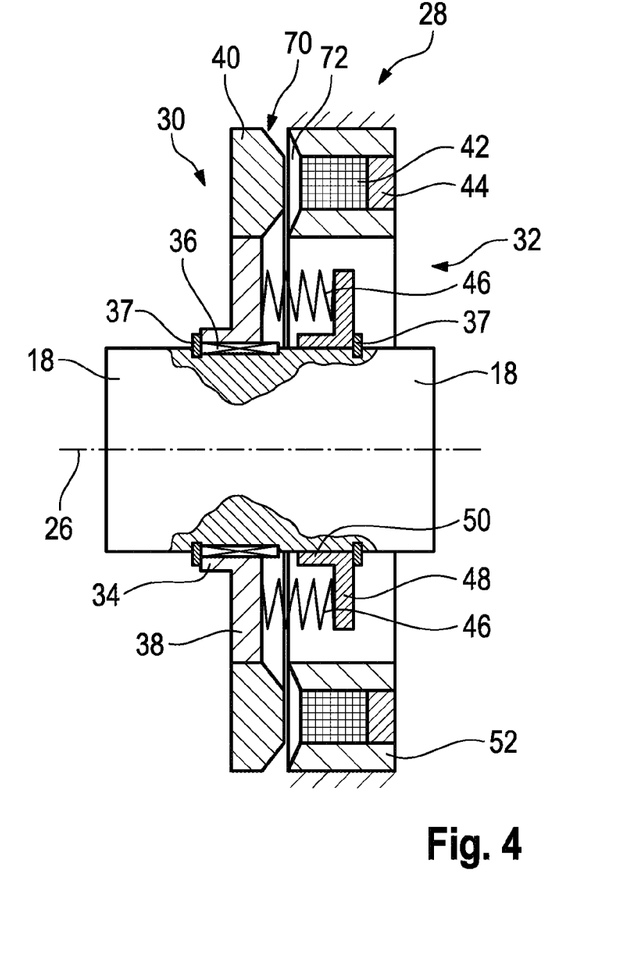
FIG. 4 shows a longitudinal section through an example of an actuator assembly according to the present subject matter with a geometry of the actuator slide which influences the magnetic field for a clutch or brake according to the present subject matter.

FIG. 4 shows a longitudinal section along the rotational axis 26 through an actuator assembly 28 for a clutch or brake.

In contrast to the examples which are shown in FIGS. 2 and 3, the actuator slide 30 has a chamfer 70 in the radially outer region 40. In a similar manner to the ferromagnetic components 66, the chamfer 70 influences the magnetic field which is generated by the coil 42, with the result that the action of force by way of the magnetic field on the actuator slide 30 can be adapted at times by way of the chamfer 70.

Furthermore, the coil former 52 has an annular cutout 72 which faces the actuator slide 30 and is adapted to the external geometry of the chamfer 70.

In the first position of the actuator slide 30, the chamfer 70 is therefore arranged in sections within the cutout 72.

The method of operation of the actuator assembly 28 is the same as in FIGS. 2 and 3, with the result that the actuator slide 30 is fixed in the second position by way of the springs 46, and is fixed in the first position by way of the permanent magnet 44.

In FIG. 4, the first position of the actuator slide 30 is likewise determined by way of the supporting section 48 or the axial projection 50 of the supporting section 48.

The actuator slide 30 moves a clutch or brake which is coupled functionally to it.

Figure 5:
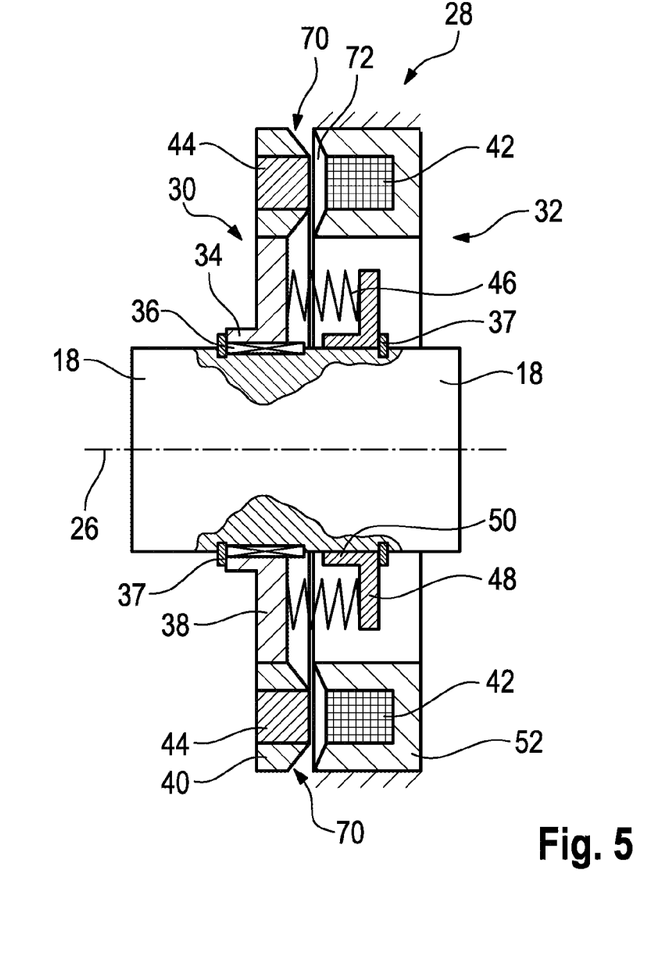
FIG. 5 shows a longitudinal section through an example of an actuator assembly according to the present subject matter, with a permanent magnet in the actuator slide for a clutch or brake according to the present subject matter.

FIG. 5 shows an example of the actuator assembly 28 in a longitudinal section along the rotational axis 26.

In contrast to the example which is shown in FIG. 4, the permanent magnet 44 is not fastened in a stationary manner to the coil former 52, but rather is integrated into the radially outer region 40 of the actuator slide 30 and is connected fixedly to the shaft 18 to rotate with it.

The permanent magnet 44 fixes the actuator slide 30 in the first position by way of its magnetic field which acts on the ferromagnetic coil former 52.

In this example, the permanent magnet 44 extends axially over the entire radially outer region 40 of the actuator slide 30, and divides the radially outer region 40 into two annular components. It is also the case here that the actuator slide 30 moves a clutch 14 or brake 12 which is coupled functionally to it.

Figure 6:
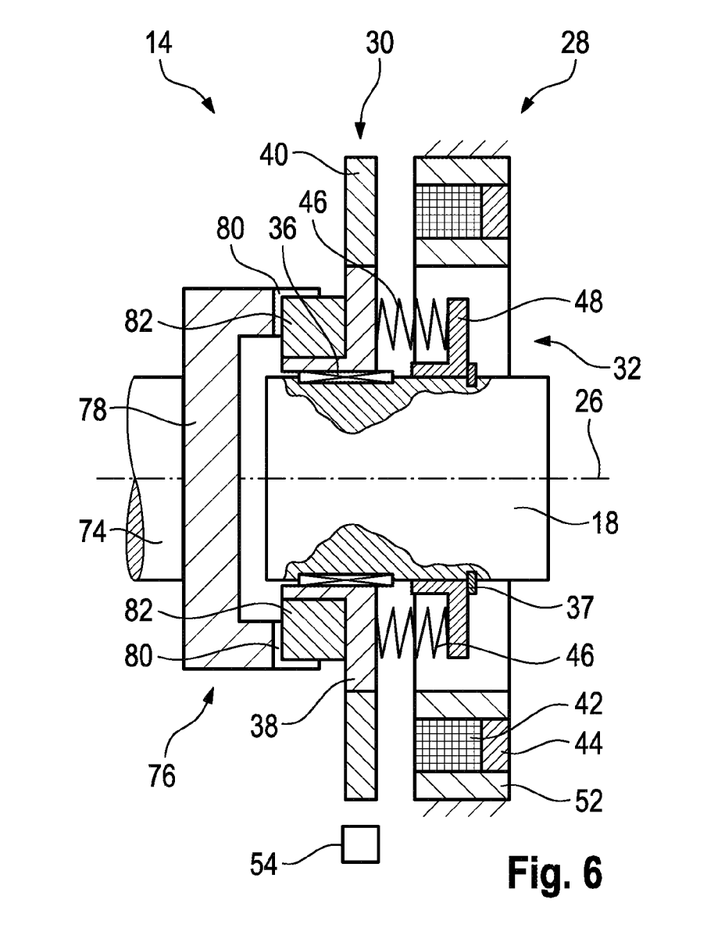
FIG. 6 shows a longitudinal section through an example of an actuator assembly according to the present subject matter of a positively locking, switchable clutch according to the present subject matter, configured as a claw clutch.
Figure 7:
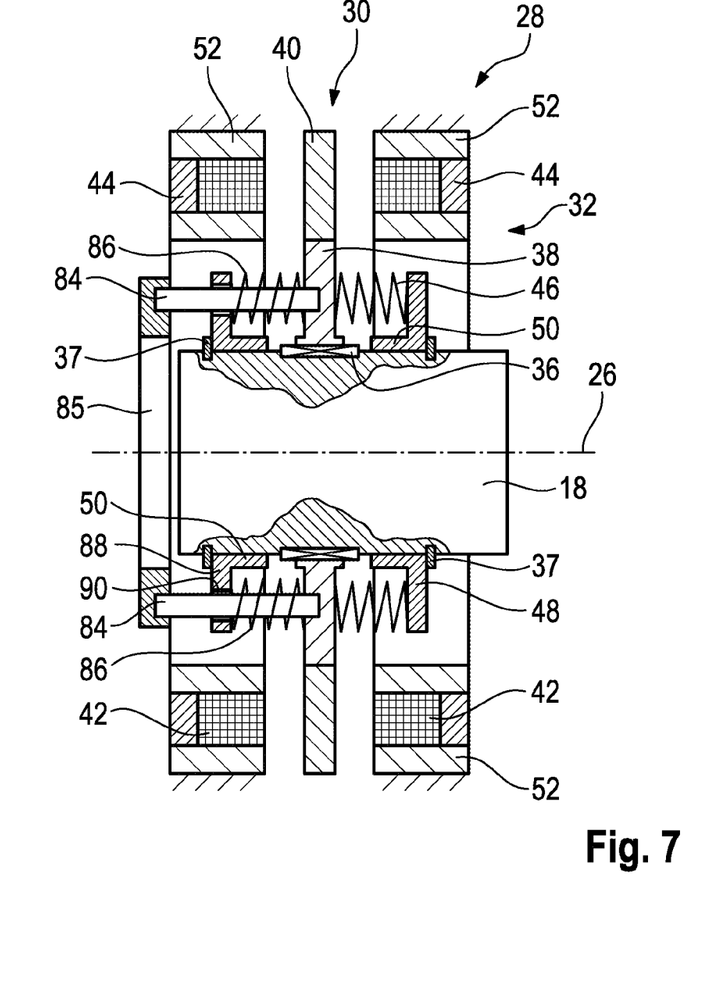
FIG. 7 shows a longitudinal section through an example of an actuator assembly according to the present subject matter for a clutch or brake according to the present subject matter, with three stable positions realized by way of two coils.
Figure 8:
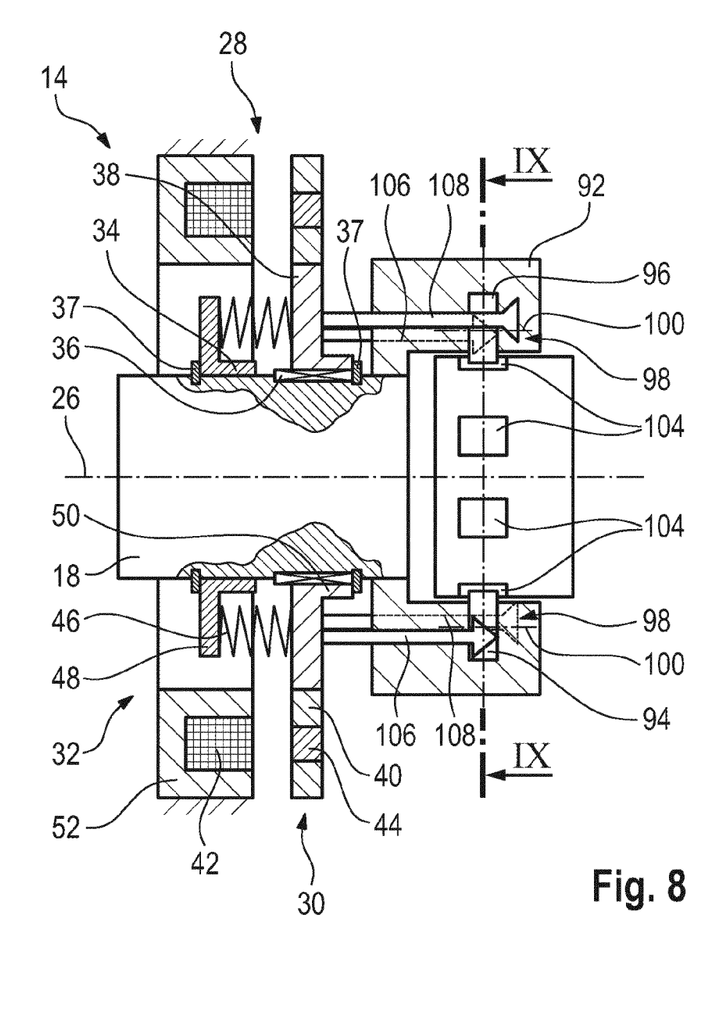
FIG. 8 shows a longitudinal section through an example of an actuator assembly according to the present subject matter of a positively locking, switchable clutch according to the present subject matter, configured as a freewheel clutch.
Figure 9:
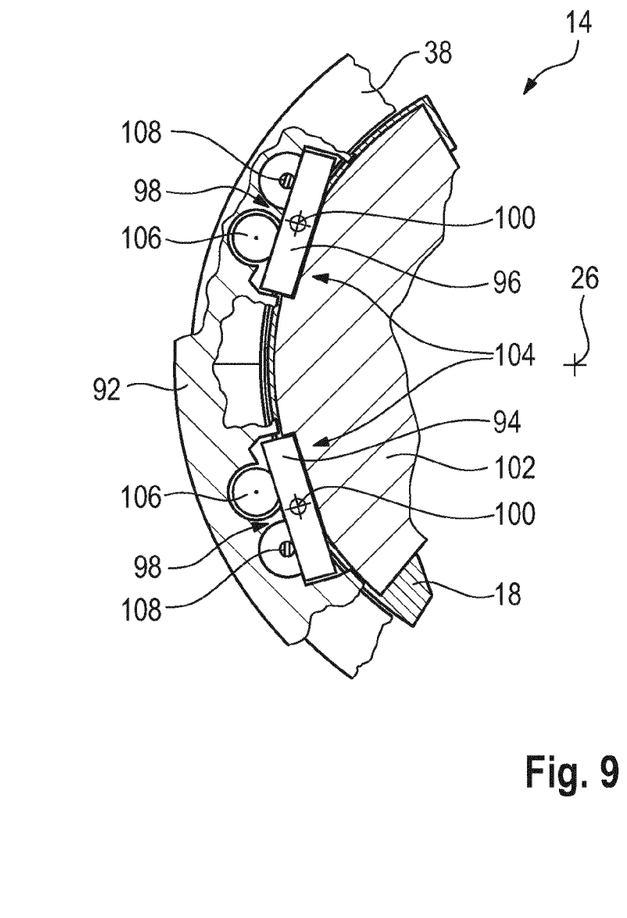
FIG. 9 shows a section through the positively locking, switchable clutch from FIG. 8 along the line IX-IX.

In the following text, various examples of the positively locking, switchable clutches 14 or the brakes 12 according to the present subject matter will be described based on FIGS. 6 to 9. FIGS. 6, 8 and 9 show examples of the positively locking, switchable clutch 14, in accordance with which two rotatable shafts can be coupled to one another by way of the clutch 14. FIG. 7 shows an example of a positively locking, switchable clutch 14 or a brake 12 according to the present subject matter, in accordance with which the shaft can also be coupled to the housing of the brake 12.

The actuator assembly 28 of the clutches 14 and the brakes 12 have partially different features from the examples which are shown in FIGS. 2 to 5. The features, which are considered to be differences, are independent, and can also be present in any desired way in the examples of FIGS. 2 to 5.

FIG. 6 shows a longitudinal section along the rotational axis 26 of one example of a positively locking clutch 14 according to the present subject matter. In this example, the clutch 14 is configured as a claw clutch.

Accordingly, the positively locking clutch 14 has two shafts 18 and 74 which are arranged concentrically with respect to one another and are both mounted such that they can be rotated about the rotational axis 26.

In the coupling region 76 of the shafts 18 and 74, the shaft 74 has a coupling section 78 which has a greater diameter than the shaft 74. The coupling section 78 encloses one end of the shaft 18 in sections. In the longitudinal section, the coupling section 78 is a substantially U-shaped projection which is connected fixedly to the shaft 74 and has a plurality of cutouts 80 at its front-side end which faces the actuator slide 30, as a result of which a part of a claw clutch is formed.

In order to couple the shaft 18 and the shaft 74, coupling jaws 82 are provided on the radially inner region 38 of the actuator slide 30, which coupling jaws 82 can engage into the cutouts 80 of the coupling section 78 of the shaft 74. For this purpose, the coupling jaws 82 are fastened on that side of the actuator slide 30 which faces the shaft 74.

In this example, as shown in FIG. 6, the second position of the actuator slide 30 is determined by way of the positively locking engagement of the coupling jaws 82 into the cutouts 80 of the coupling section 78 which are provided for this purpose. Accordingly, in that position of the actuator slide 30 which is shown, the positively locking clutch 14 is in the blocked position, in which the shafts 18 and 74 are connected fixedly for conjoint rotation.

In the first position of the actuator slide 30, that is to say in the position, in which the actuator slide 30 is fixed by way of the permanent magnet 44, the shafts 18 and 74 are not connected fixedly for conjoint rotation, and the clutch 14 is accordingly in a freewheel position.

FIG. 7 shows an example of an actuator for a positively locking, switchable clutch 14 or brake 12 in a longitudinal section along the rotational axis 26.

In contrast to the example which is shown in FIG. 6, actuating apparatuses 84 are provided on the actuator slide 30 of FIG. 6, which actuating apparatuses 84 are moved by way of the axial displacement of the actuator slide 30.

The actuating apparatuses 84 are of rod-shaped configuration and extend in the axial direction parallel to the rotational axis 26. At their one end, they are connected fixedly to the radially inner region 38 of the actuator slide 30 and, at their other end, the actuating apparatuses 84 are connected fixedly to a slider sleeve 85 of the claw clutch.

Moreover, in the example which is shown in FIG. 7, the actuator slide 30 is fixed in three positions by way of the actuator 32, the coils 42 not being energized in all three positions.

For this purpose, the coils 42 are provided with corresponding coil formers 52 on the two sides of the actuator slide 30. In addition, permanent magnets 44 are provided on the coils 42, with the result that the permanent magnets 44 fix the actuator slide 30 in a position if the actuator slide 30 is at a corresponding small distance from the respective permanent magnet 44.

In this example, the intermediate position is realized by way of springs 46, 86.

In a similar manner to the springs 46, the springs 86 extend in the axial direction and are fastened at their one end to a side of the actuator slide 30 and at their other end to a supporting section 88. The springs 86 enclose the actuating apparatuses 84 partially between the supporting section 88 and the radially inner region 38 of the actuator slide 30.

The supporting section 88 is configured substantially like the supporting section 48, and is accordingly also connected fixedly to the shaft 18. The supporting section 88 has openings 90, through which the actuating apparatuses 84 can protrude.

In that intermediate position of the actuator assembly 28 which is shown in FIG. 7, the restoring forces of the springs 46 and 86 balance one another out, with the result that the actuator slide 30 is fixed in the intermediate position.

The braking function of the brake 12 is not generated directly between the actuator slide 30 and the coil former 52, but rather always by way of a separate component which has a switching toothing system.

For example, the slider sleeve 85 can be provided with a switching toothing system, and, in a position of the actuator slide 30 (in the first position, in the second position, and/or the intermediate position), can engage into corresponding toothing systems on the housing of the brake 12, in order to fix the shaft 18.

Accordingly, the slider sleeve 85 can also move parts of a clutch 14 with respect to one another, in order to switch them. It is also possible to actuate two clutches 14 or two brakes 12 or a combination of a clutch 14 and a brake 12 by way of one actuator assembly 28, in each case one of the two clutches 14 or brakes 12 being engaged in the first and second position. In the intermediate position, the two clutches 14 or brakes 12 can be engaged in one example, and the two clutches 14 or brakes 12 can be disengaged in a further example.

In the following text, an example of the positively locking clutch 14 will be described based on FIGS. 8 and 9, which example is based on a thrust wedge mechanism principle and is configured as a switchable freewheel. FIG. 8 shows the clutch 14 in a longitudinal section along the rotational axis 26, and FIG. 9 shows the clutch 14 in a cross section along the sectional line IX-IX from FIG. 8.

In contrast to the previous examples, an annular locking pawl carrier 92 which is connected fixedly to the shaft 18 to rotate with it adjoins one end of the shaft 18.

The locking pawl carrier 92 has first locking pawls 94 and second locking pawls 96 which are arranged in an alternating manner in the circumferential direction around the locking pawl carrier 92. Moreover, the locking pawl carrier 92 has locking pawl receptacles 98, in which the first and second locking pawls 94, 96 are mounted such that they can be pivoted about a pivot axis 100. FIGS. 8 and 9 show in each case only a first locking pawl 94 and a second locking pawl 96.

The locking pawl carrier 92 encloses a shaft 102 partially.

The shaft 102 has coupling depressions 104 which run on the outer side in opposite directions in the circumferential direction and have a wedge shape in cross section (see FIG. 9). The coupling depressions 104 are configured in such a way that the first and second locking pawls 94, 96 engage in a positively locking manner into the coupling depressions 104 in a coupling state, as shown in FIG. 9, and connect the shaft 102 fixedly to the locking pawl carrier 92 and therefore to the shaft 18 for conjoint rotation.

The locking pawls 94, 96 are actuated in each case mechanically by way of a pressure rod 106 and a tension rod 108, by the locking pawls 94, 96 which are configured as two-armed levers acting in each case at one end on a pressure rod 106 and at the other end on an associated tension rod 108. The pressure rods 106 and the tension rods 108 are arranged in pairs in the circumferential direction, with the result that the pressure rods 106 and the tension rods 108 actuate the first locking pawls 94 and the second locking pawls 96 in different pivoting directions.

At one end, the pressure rods 106 and the tension rods 108 are connected fixedly to the radially inner region of the actuator slide 30.

In the first position, that is to say in the position, in which the actuator slide is fixed by way of the permanent magnet, the first and second locking pawls 94, 96 are arranged in the respective locking pawl receptacles 98 in such a way that the shaft 102 can rotate freely, that is to say is not connected fixedly to the shaft 18 so as to rotate with it. Accordingly, the positively locking, switchable clutch 14, that is to say the freewheel which is shown, is in the freewheel position in this position of the actuator slide 30.

FIGS. 8 and 9 show the actuator slide 30 in the second position. In this position, the pressure rods 106 and the tension rods 108 load the respective first and second locking pawls 94, 96, with the result that the first and second locking pawls 94, 96 engage into the respective coupling depressions and connect the shafts 18 and 102 fixedly to one another for conjoint rotation. The clutch 14 which is shown is therefore in the blocked position in the position which is shown.

Various features of the disclosed features and examples can be combined with one another as desired without departing from the scope of the present subject matter. In particular, the features which are listed as differences can also be realized in other embodiments independently from one another in a different way.

What is claimed is:

1. An actuator assembly for a positively locking, switchable clutch or a brake, comprising:
a shaft that can be rotated with respect to a rotational axis,
an actuator slide for the actuation of the positively locking, switchable clutch or the brake, the actuator slide being connected to the shaft for conjoint rotation and configured to be moved relative to the shaft in the axial direction between a first position and a second position, and
an actuator which is at least partially stationary and moves the actuator slide between the first position and the second position, wherein
the actuator comprises a coil which is stationary and generates a magnetic field in the energized state, in which the actuator slide can be moved out of the first position into the second position or vice versa,
the coil is not energized in the first and second position, and
the actuator fixes the actuator slide in the first position and the second position, and
the actuator comprises a spring that extends in the axial direction and fixes the actuator slide in the first or the second position, the spring being always connected to the actuator slide and to a supporting section of the actuator.

2. The actuator assembly according to claim 1, wherein the actuator slide is mounted via a linear guide on the shaft.

3. The actuator assembly according to claim 1, wherein the spring adjoins the supporting section at its first end and adjoins the actuator slide at its second end, and the supporting section is secured at least against axial displacement on the shaft.

4. The actuator assembly according to claim 1, wherein a ball catch is provided on the shaft, and the ball catch fixes the actuator slide in an intermediate position between the first and the second position.

5. The actuator assembly according to claim 1, wherein the actuator slide is made circumferentially from a ferromagnetic material at least in a radially outer region.

6. The actuator assembly according to claim 1, wherein the actuator comprises a permanent magnet that fixes the actuator slide in the first or second position.

7. The actuator assembly according to claim 5, wherein the permanent magnet is fastened to the coil or to the actuator slide, and an opponent magnet is arranged in an iron circuit of the actuator assembly.

8. The actuator assembly according to claim 1, wherein the actuator slide lies opposite the coil and is separated from the coil by an air gap, the air gap is modified in the case of the change between the first and the second position, and the actuator slide is configured to move toward the coil and away from the coil.

9. The actuator assembly according to claim 1, wherein the actuator slide is spaced from the coil at a minimum spacing of 0.1 mm to 2 mm.

10. The actuator assembly according to claim 1, wherein a sensor is provided to determine the position of the actuator slide, and the sensor operates based on a magnetic operating principle.

11. A positively locking, switchable clutch or brake for a motor vehicle drive train, comprising:

the actuator assembly according to claim 1, wherein the actuator slide is configured to switch the clutch or brake between a freewheel position and a blocked position.

\* \* \* \* \*